(12) United States Patent
Smith

(10) Patent No.: US 6,672,677 B1
(45) Date of Patent: Jan. 6, 2004

(54) WHEEL RIM PROTECTION DEVICE

(76) Inventor: Alvin Smith, 124 Meadow Lake Dr., Monroe, LA (US) 71203

( * ) Notice: Subject to any disclaimer, the term of this patent is extended or adjusted under 35 U.S.C. 154(b) by 0 days.

(21) Appl. No.: 10/188,450

(22) Filed: Jul. 5, 2002

(51) Int. Cl.⁷ .............................. B60B 7/00; B05C 11/11
(52) U.S. Cl. ............................ 301/37.103; 301/37.104; 118/505
(58) Field of Search ................................. 118/504, 505; 301/37.101, 37.103, 37.104, 37.42

(56) References Cited

U.S. PATENT DOCUMENTS

| | | | | |
|---|---|---|---|---|
| 2,627,839 A | * | 2/1953 | Hudgins et al. | 118/505 |
| 3,192,896 A | * | 7/1965 | Irving | 118/505 |
| 4,784,440 A | * | 11/1988 | Fair | 301/37.103 |
| 4,874,206 A | * | 10/1989 | Sampson | 301/37.103 |
| 4,955,670 A | * | 9/1990 | Koller | 301/37.31 |
| 5,423,599 A | * | 6/1995 | Sherod et al. | 301/37.103 |
| 5,435,630 A | * | 7/1995 | Tucker | 301/37.103 |
| 5,759,276 A | * | 6/1998 | Addison, Jr. | 118/504 |
| 6,412,878 B1 | * | 7/2002 | Bell et al. | 301/37.104 |

* cited by examiner

*Primary Examiner*—S. Joseph Morano
*Assistant Examiner*—Jason R. Bellinger

(57) ABSTRACT

A wheel rim protection device for protecting wheel rims when a user is using sprays to clean the tires on a vehicle. The wheel rim protection device includes a dome-shaped cover member having a wall with a main portion, and also having an opening centrally-disposed through the wall, and further having an enlarged rim portion being adapted to detachably attach to a wheel rim on a vehicle, and also having a first arcuate portion being disposed along a portion of an edge forming the opening and which is angled relative to the main portion of the wall to prevent over-spray from coming into contact with the wheel rim.

5 Claims, 3 Drawing Sheets

WHEEL RIM PROTECTION DEVICE

BACKGROUND OF THE INVENTION

1. Field of the Invention

The present invention relates to wheel rim shields and more particularly pertains to a new wheel rim protection device for protecting wheel rims when a user is using sprays to clean the tires on a vehicle.

2. Description of the Prior Art

The use of wheel rim shields is known in the prior art. More specifically, wheel rim shields heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,874,206; 2,627,839; 5,435,630; 5,423,599; 4,784,440; and U.S. Pat. No. Des. 4,784,440.

While these devices fulfill their respective, particular objectives and requirements, the aforementioned patents do not disclose a new wheel rim protection device. The prior art includes inventions having cover members being detachably attached to the wheel rims of vehicles.

SUMMARY OF THE INVENTION

The general purpose of the present invention, which will be described subsequently in greater detail, is to provide a new wheel rim protection-device which has many of the advantages of the wheel rim shields mentioned heretofore and many novel features that result in a new wheel rim protection device which is not anticipated, rendered obvious, suggested, or even implied by any of the prior art wheel rim shields, either alone or in any combination thereof. The present invention includes a dome-shaped cover member having a wall with a main portion, and also having an opening centrally-disposed through the wall, and further having an enlarged rim portion being adapted to detachably attach to a wheel rim on a vehicle, and also having a first arcuate portion being disposed along a portion of an edge forming the opening and which is angled relative to the main portion of the wall to prevent over-spray from coming into contact with the wheel rim. None of the prior art describes the structure of the present invention.

There has thus been outlined, rather broadly, the more important features of the wheel rim protection device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new wheel rim protection device which has many of the advantages of the wheel rim shields mentioned heretofore and many novel features that result in a new wheel rim protection device which is not anticipated, rendered obvious, suggested, or even implied by any of the prior art wheel rim shields, either alone or in any combination thereof.

Still another object of the present invention is to provide a new wheel rim protection device for protecting wheel rims when a user is using sprays to clean the tires on a vehicle.

Still yet another object of the present invention is to provide a new wheel rim protection device that is easy and convenient to use.

Even still another object of the present invention is to provide a new wheel rim protection device that not only covers the rims but also the hubcaps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
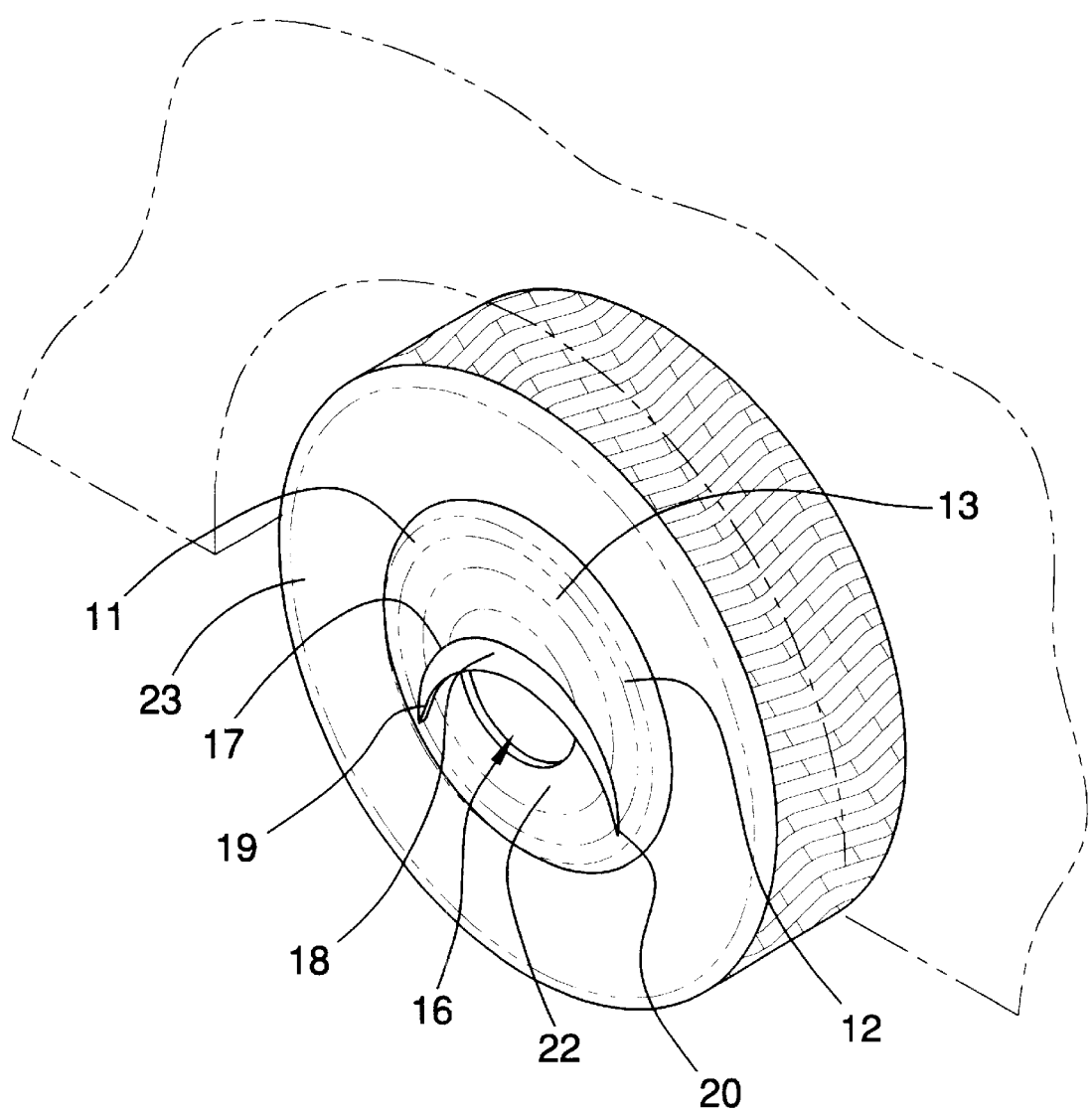
FIG. 1 is a perspective view of a new wheel rim protection device according to the present invention and shown in use.
Figure 2:
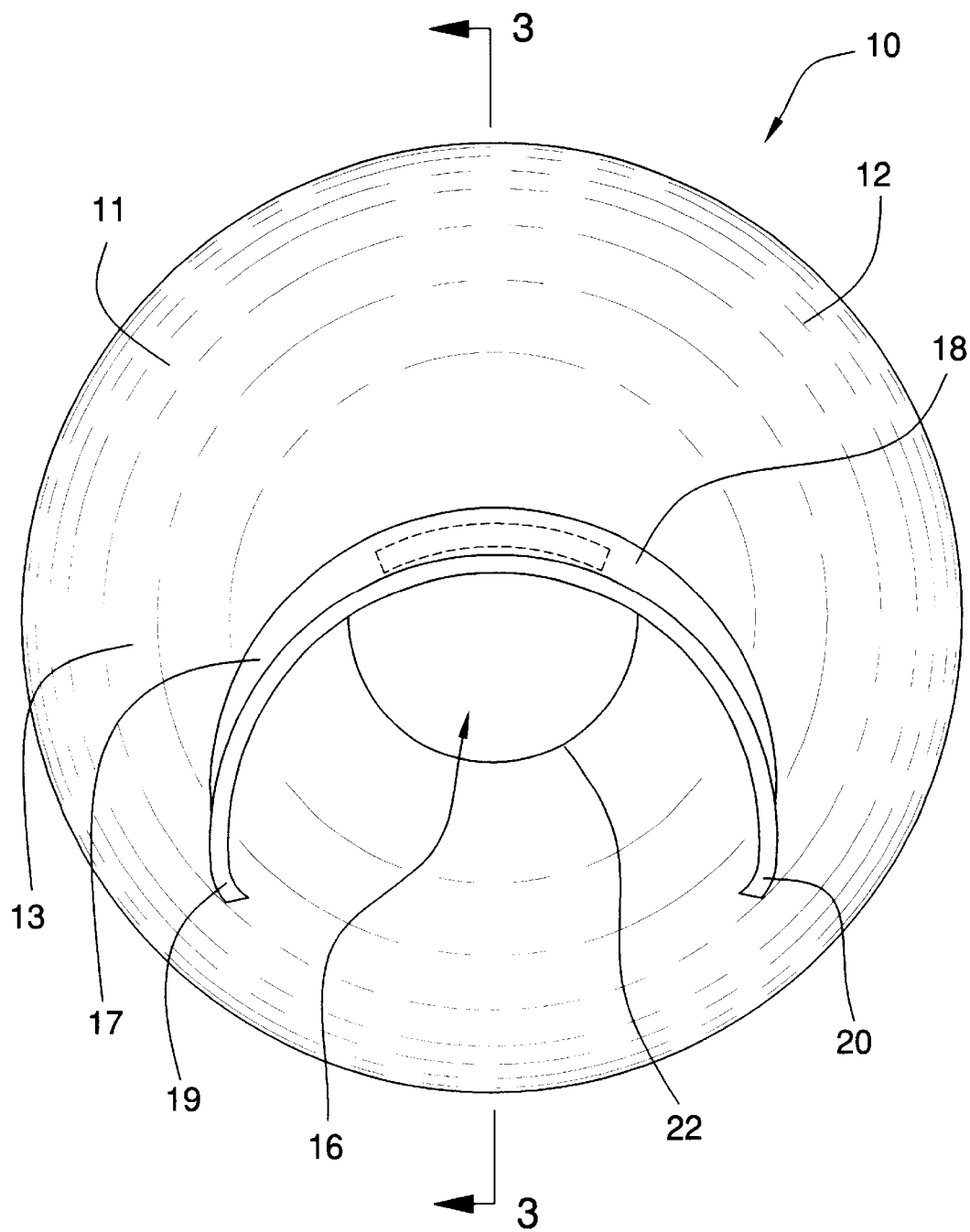
FIG. 2 is a front elevational view of the present invention.
Figure 3:
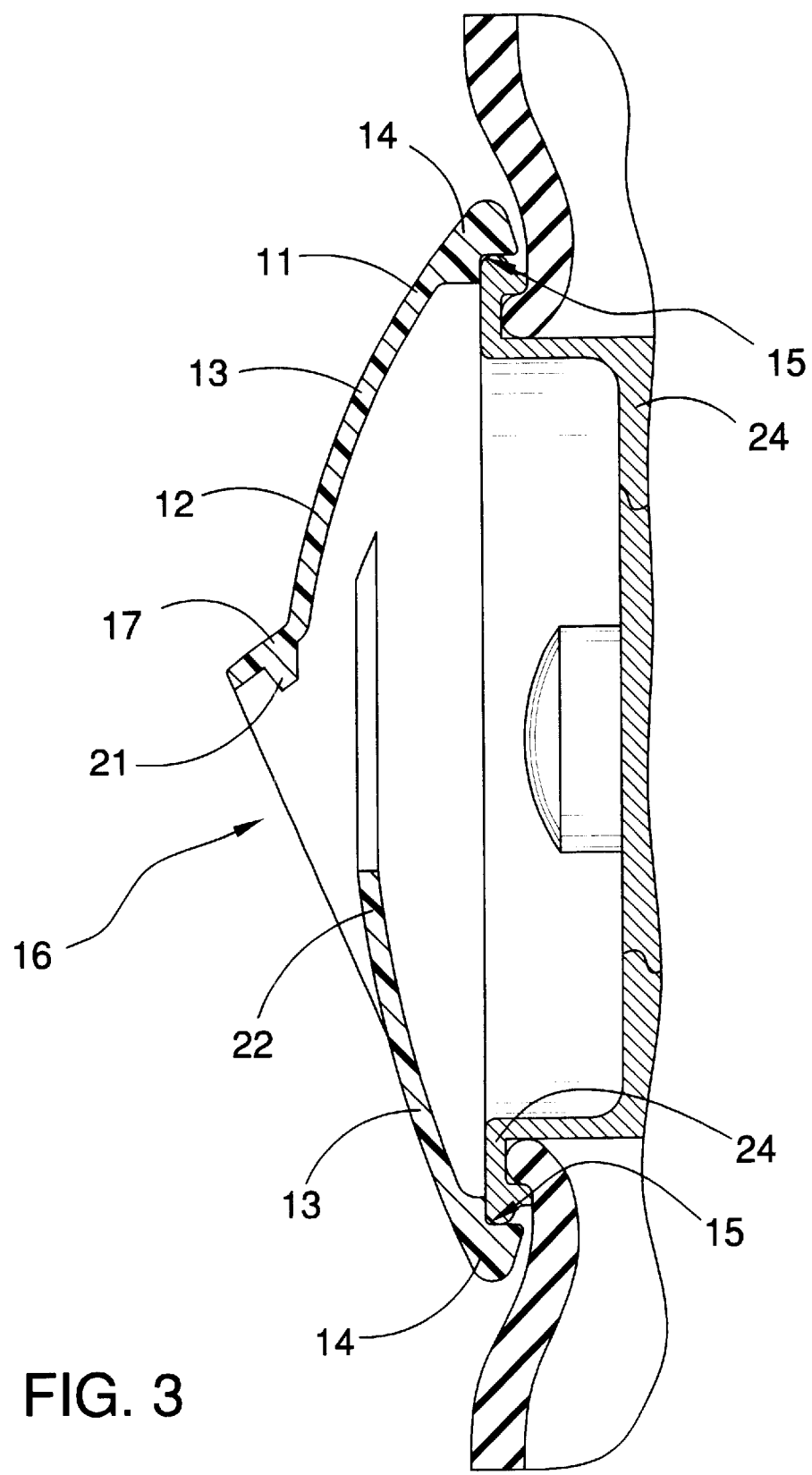
FIG. 3 is a cross-sectional view of the present invention.

With reference now to the drawings, and in particular to FIGS. 1 through 3 thereof, a new wheel rim protection device embodying the principles and concepts of the present invention and generally designated by the reference numeral 10 will be described.

As best illustrated in FIGS. 1 through 3, the wheel rim protection device 10 generally comprises a dome-shaped cover member 11 having a wall 12 with a main portion 13, and also having an opening 16 centrally-disposed through the wall 12, and further having an enlarged rim portion 14 being adapted to detachably attach to a wheel rim 24 on a vehicle, and also having a first arcuate portion 17 being disposed along a portion of an edge forming the opening 16 and which is angled relative to the main portion 13 of the wall 12 to prevent chemical over-spray from coming into contact with the wheel rim 24. The rim portion 14 has a thickness which is enlarged relative to the main portion 13 of the wall 12, and has an inner circumferential L-shaped groove 15 being disposed in a corner thereof and being adapted to receive an outer circumferential edge of the wheel rim 24. The first arcuate portion 17 of the wall 12 is angled outwardly relative to the main portion 13 of the wall 12. The first arcuate portion 17 is band-shaped and is tapered to ends 19,20 thereof with the first arcuate portion 17 having an intermediate section 18 which is wide relative to the ends 19,20 thereof to substantially shield the opening 16 through the wall 12. The cover member 11 further has a rib 21 being integrally and longitudinally disposed upon an underside of the intermediate section 18 of the first arcuate portion 17. The cover member 11 further has a second arcuate portion 22 which is disposed along a portion of the edge forming the opening 16 and which is opposed to the first arcuate portion 17 and which is angled inwardly relative to the main portion 13 of the wall 11.

In use, the user-would attach and snap on the cover member 11 to the wheel rim 24 of a tire 23, and would be able to apply cleaning chemicals to the tire 23 without any of the cleaning chemicals getting on the user's expensive wheel rims 24, and once the user is finished, the user can easily and quickly detach the cover member 11 from wheel rim 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the wheel rim protection device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel rim protection device comprising:
   a dome-shaped cover member having a wall with a main portion, and also having an opening centrally-disposed through said wall, and further having an enlarged rim portion being adapted to detachably attach to a wheel rim on a vehicle, and also having a first arcuate portion being disposed along a portion of an edge forming said opening and which is angled relative to said main portion of said wall to prevent chemical over-spray from coming into contact with the wheel rim, said rim portion having a thickness which is enlarged relative to said main portion of said wall, having an inner circumferential L-shaped groove disposed in a corner thereof and being adapted to receive an outer circumferential edge of the wheel rim.

2. A wheel rim protection device as described in claim 1, wherein said first arcuate portion of said wall is angled outwardly relative to said main portion of said wall.

3. A wheel rim protection device as described in claim 2, wherein said first arcuate portion is band-shaped and is tapered to ends thereof with said first arcuate portion having an intermediate section which is wide relative to said ends thereof to substantially shield said opening through said wall.

4. A wheel rim protection device as described in claim 3, wherein cover member further has a rib being longitudinally disposed upon an underside of said intermediate section of said first arcuate portion.

5. A wheel rim protection device as described in claim 4, wherein said cover member further has a second arcuate portion which is disposed along a portion of said edge forming said opening and which is opposed to said first arcuate portion and which is angled inwardly relative to said main portion of said wall.

* * * * *